Feb. 4, 1936.  H. B. GREENWOOD  2,030,027
SHAFT ADJUSTING MEANS
Filed Dec. 31, 1934  2 Sheets-Sheet 1
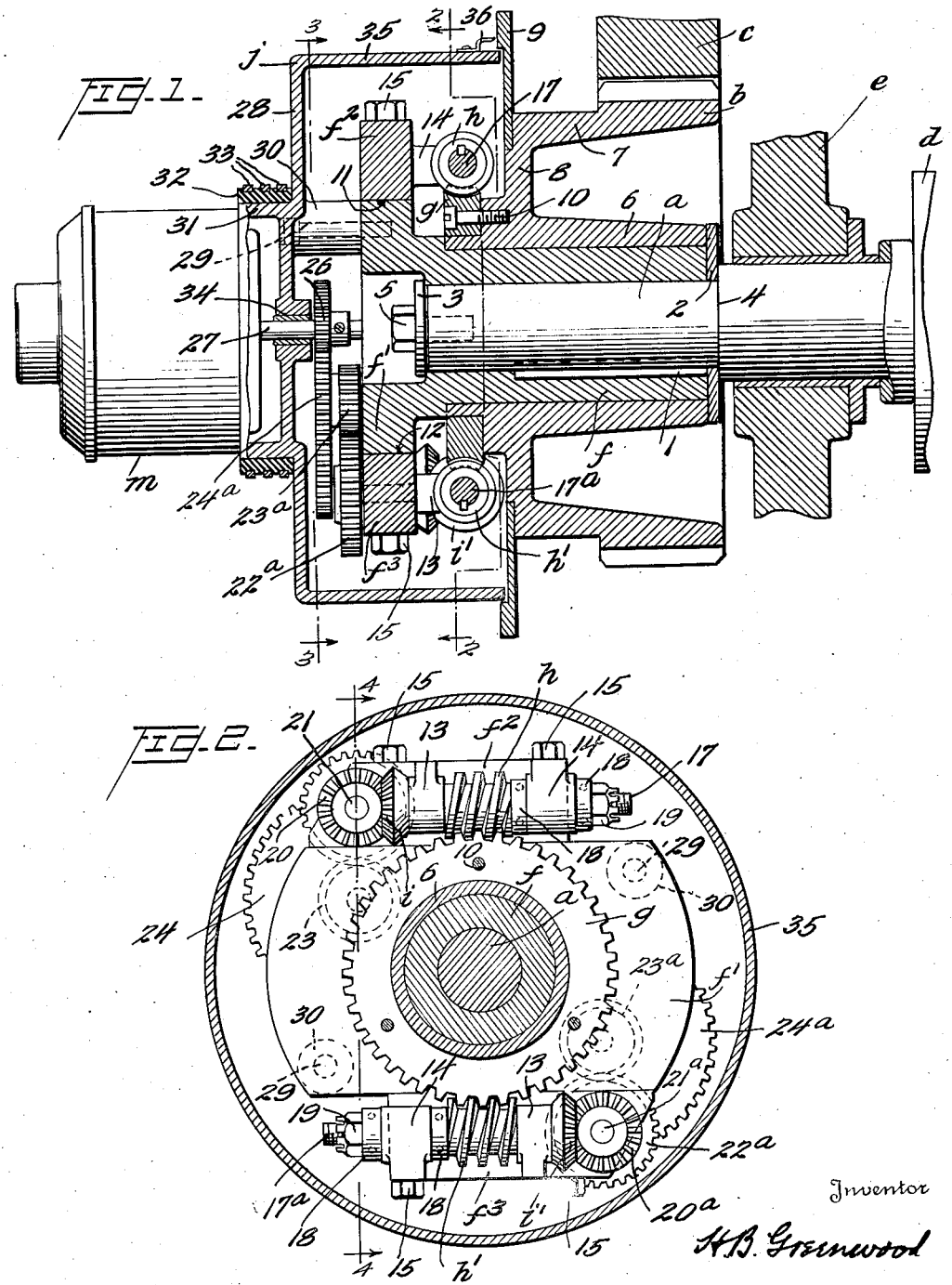
Inventor
H. B. Greenwood
By Robert H. Watson
Attorney Feb. 4, 1936. H. B. GREENWOOD 2,030,027
SHAFT ADJUSTING MEANS
Filed Dec. 31, 1934 2 Sheets-Sheet 2
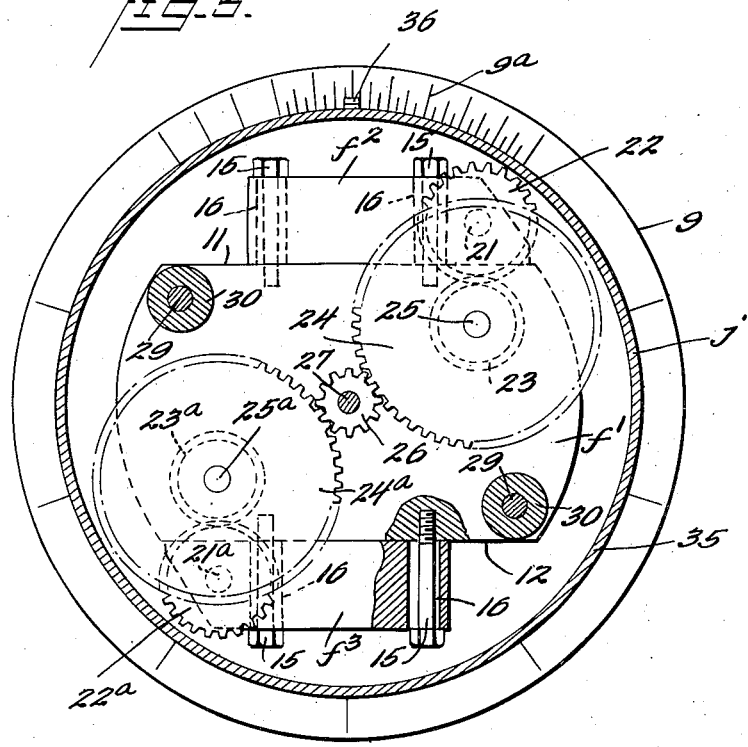

Patented Feb. 4, 1936

2,030,027

UNITED STATES PATENT OFFICE 2,030,027

SHAFT ADJUSTING MEANS

Henry B. Greenwood, Glenarm, Md., assignor to F. X. Hooper Company, Inc., Glenarm, Md., a corporation of Maryland Application December 31, 1934, Serial No. 760,011

11 Claims. (Cl. 74—395)

In machines of various kinds wherein a plurality of shafts are driven in unison through a gear train, such as printing presses and machines for cutting and punching sheet or web material, it becomes necessary at times to adjust one or more of the shafts angularly with respect to its driving gear in order that the member on the shaft which prints or otherwise operates on the material passing through the machine may be brought into proper registry with the material. The present invention relates to mechanism for effecting such angular adjustment of a shaft with respect to its driving gear, while the machine is running or while the machine is stopped. Several types of adjusting mechanism for this purpose have been in use for many years, including one in which the drive gear, loose on the shaft, is operatively connected to the shaft through a worm gear and pinion, and the pinion is operated to effect the adjustment. The present improvements relate to this type.

In carrying out the invention, the worm gear is secured to the drive gear, and upon a sleeve which is secured to the shaft I provide two worm pinions which mesh with the worm gear. While one pinion would suffice for transmitting the power from the drive gear to the shaft, I provide the two pinions, on separate shafts, and mount the pinion shafts on the sleeve so that they are adjustable endwise, whereby all back-lash between the teeth of the pinions and worm gear may be easily taken up, this being an important matter in securing perfect registration. For rotating the worm pinions, a reversible electric motor is supported by the aforesaid sleeve with the shaft of the motor co-axial with the driven shaft, and separate trains of gearing, supported on the sleeve, connect the motor shaft with the worm pinion shafts whereby the latter may be rotated in unison. By operating the motor in one direction or the other, the driven shaft may be adjusted angularly with respect to its driving gear in either direction and to any desired extent. All of the parts, including the motor and gearing, are arranged so that they are perfectly balanced on the shaft.

In the accompanying drawings,

Fig. 1 is a central section through the drive gear and the adjusting mechanism taken longitudinally of the shaft upon which it is mounted, the motor for operating the mechanism being shown in side elevation;

Fig. 2 is a section on the line 2—2 of Fig. 1;

Fig. 3 is a section on the line 3—3 of Fig. 1; a detail of the supporting means for the gears being also shown in section, and, Fig. 4 is a section on the line 4—4 of Fig. 2.

Referring to the drawings, $a$ represents a shaft in a power driven machine which requires angular adjustment with respect to its driving gear $b$, which latter, it will be understood, is one member of a gear train for driving the various working parts of an organized machine, such as a printing press. Another gear in the gear train is partly indicated at $c$ in mesh with the gear $b$, and $d$ may represent a printing cylinder secured to the shaft and adjustable with it for the purpose of causing correct registry of the type with the paper sheets, web or blanks passing through the machine.

The shaft is mounted in suitable bearings in the frame $e$ of the machine, and carries at one end a sleeve $f$ which is secured to the shaft so as to rotate therewith by a key $l$. The sleeve is held against endwise movement on the shaft between washers 2 and 3, the former fitting against a shoulder 4 on the shaft and the latter being secured to the end of the shaft by a threaded bolt 5. The drive gear $b$ is loosely mounted on the sleeve so that the latter and the shaft to which it is secured may turn with respect to the drive gear.

The toothed portion of the drive gear is connected with the hub 6 by a web which extends laterally from the toothed portion, as shown at 7, and thence radially inward to the hub, as shown at 8, and upon this latter portion is mounted a flat ring 9 which extends radially outward from the web and is provided with a scale $9^a$ graduated in fractions of an inch. The hub extends laterally beyond the web 8 and a worm gear $g$ is fixedly secured to the end of the hub by screws 10, said gear being concentric with the shaft and sleeve.

The sleeve $f$ extends beyond the end of the shaft, as shown, and has a radially extending head $f'$ with flat parallel edges 11 and 12 at opposite sides of and equi-distant from the axis of the shaft and sleeve. On these edges are rectangular bearing blocks $f^2$ and $f^3$, identical in structure, each block having a pair of laterally projecting spaced arms or brackets 13 and 14 formed with bearings at their ends. The blocks are adjustably secured to the flat surfaces of the head by bolts 15 which extend through holes 16, into the head, the holes, as indicated in Fig. 3, being sufficiently large to permit of adjustment of the blocks longitudinally of the flat surfaces of the head. The bearing brackets of the block $f^2$ carry a shaft 17 which is journalled in the bearings, and on the shaft, between the bearings, is a worm pinion $h$, which is in mesh with the worm gear $g$. A similar shaft $17^a$ mounted in the bearings of the block $f^3$ carries a worm pinion $h'$ which meshes with the worm gear diametrically opposite the pinion $h$. Ball raceways 18 are arranged on the shafts $17, 17^a$ at opposite sides of the bearing on bracket 14, and nuts 19 threaded onto the shafts are provided for taking up end play of the shafts. Beveled gears $i, i'$ are secured to the ends of the shafts 17 and $17^a$, respectively, adjacent the bearings 13.

From the structure thus far described, it will be evident that when the drive gear $b$ is rotated, the sleeve $f$, which is interlocked with it through the worm gearing, will be driven, and since the sleeve is keyed to the shaft $a$, the latter will turn in unison with the drive gear. It will also be evident that by turning the two worm pinions simultaneously the sleeve and the driven shaft will be angularly advanced or retarded with respect to the drive gear $b$.

In order to obtain exact adjustment of the driven shaft with respect to the driving gear, it is necessary to take up all lost motion that may be due to wear between the worm pinion and worm gear. End play of the shafts carrying the worm pinions is taken up in the manner hereinbefore described. A single worm pinion would suffice for driving the sleeve and shaft $a$, but in order to compensate for wear between the pinion and worm gear teeth, the two worm pinions are provided and mounted on the adjustable bearing blocks $f^1$ and $f^3$, respectively. The adjustment necessary to compensate for wear of the teeth is very slight and can be easily made by moving both of the bearing blocks endwise in the same direction. This will cause the teeth of one pinion to engage the gear teeth closely on one side of the latter, and the teeth of the other pinion to closely engage the gear teeth on their opposite sides. It will be evident that adjusting both pinions to the left, in Fig. 2, for instance, will cause the threads on the upper pinion to engage closely one side of the teeth on the worm gear and the threads on the lower pinion will engage closely the opposite sides of the teeth on the worm gear. Adjustment of one pinion would accomplish the same result. Such fine adjustments will be made as wear takes place. It will be evident from this that one pinion drives the load in one direction and the other pinion serves as a check to prevent back-lash and the functions of these pinions are reversed when the load is moved in the opposite direction. Assuming that there has been wear on the teeth and that the slack has been taken out by adjustment of one or both of the worm pinions, one pinion will drive the load in one direction and the other pinion will drive the load in the opposite direction, but the two pinions will not cooperate to move the load in either direction.

The beveled pinion $i$ is in mesh with a similar gear 20 on a shaft 21 which is journalled in a transverse bore in the block $f^2$, and on the opposite end of this shaft is a spur gear 22 which is engaged by a small gear 23 secured to the hub of a large gear 24 mounted on a stud 25 which is secured to the head $f'$ of the sleeve $f$. The gear 24 is in mesh with a small gear 26 which is fast on the shaft 27 of the rotor of a reversible electric motor $m$, this motor being mounted as hereinafter explained with its motor shaft co-axial with the shaft $a$. The beveled gear $i'$ on the worm shaft $17^a$ is similarly geared to the pinion on the motor shaft. Thus, the beveled gear $i'$ meshes with a similar gear $20^a$ on a shaft $21^a$ journalled in the block $f^3$, and a spur gear $22^a$ on this shaft meshes with a small gear $23^a$ secured to the hub of a large gear $24^a$ mounted on a stud $25^a$ projecting from the head $f'$ of the sleeve $f$, and this last mentioned gear meshes with the pinion 26 on the motor shaft. The two trains of gears leading from the motor pinion are alike, and rotation of the motor shaft will cause both worm pinions to rotate in unison.

The motor $m$ is mounted centrally upon the vertical wall 28 of a cylindrical housing $j$ which is secured to the head $f'$ of the sleeve $f$ by bolts 29 which pass through said wall and into the head of said sleeve at diametrically opposite points. The bolts are surrounded by short tubes 30 which space said wall from the head. The stator of the motor is suitably secured to an outward projection 31 on said wall which is concentric with the shaft $a$, and upon this projection is mounted the annular insulator 32 which carries the collector rings 33 to which the motor brushes, not shown, are applied. The motor shaft 27 is journalled in a central bearing 34 in said wall. The peripheral wall 35 of the housing extends close to the index ring 9, and a pointer 36 on the latter wall, in cooperation with the scale $9^a$, serves to indicate the angular relation of the shaft $a$, or any operating member carried thereby, with respect to the drive gear $b$.

It will be seen from the foregoing that all of the operative parts on the shaft are perfectly balanced, which ensures smooth running and that provision is made for taking up end play of the worm pinions and back-lash that may result from wear between said pinions and the worm gear, which is important in securing perfect registration of the operating parts on the driven shaft with the work passing through the machine, or synchronization with other co-operating parts of the machine.

The motor rotates with the driven shaft but is only energized when the operator closes the motor circuit to effect an adjustment. Through push button switches and well-known electrical connections, not necessary to illustrate, the rotor of the motor may be operated in either direction and, through the gearing between the motor shaft and the shafts carrying the worm pinions the latter will be driven in the direction to angularly advance or retard the driven shaft with respect to the drive gear, as may be desired, either while the machine is running or at rest.

What I claim is:

1. The combination with a driven shaft and a drive gear rotatively mounted thereon, of a worm gear fixed to the drive gear concentric with said shaft, a sleeve secured to said shaft so as to rotate therewith, a shaft carried by the sleeve, a worm pinion on the latter shaft meshing with the worm gear, a reversible electric motor supported by said sleeve and having its shaft co-axial with said driven shaft, and gearing connecting the motor shaft with the shaft carrying the worm pinion.

2. The combination with a driven shaft and a drive gear rotatively mounted thereon, of a worm gear fixed to the drive gear concentric with said shaft, a sleeve secured to said shaft so as to rotate therewith, two shafts carried by the sleeve, worm pinions on the latter shafts meshing with the worm gear, a reversible electric motor supported by said sleeve and having its shaft co-axial with said driven shaft, and gear trains connecting the motor shaft with the shafts carrying the worm pinions.

3. The combination with a driven shaft and a drive gear rotatively mounted thereon of a worm gear fixed to the drive gear concentric with said shaft, a sleeve secured to said shaft so as to rotate therewith, two worm pinions rotatively mounted on the sleeve and meshing with the worm gear, means mounting one of said pinions for adjustment tangentially with respect to the worm gear and means for rotating said worm pinions in unison comprising a drive shaft carried by the sleeve concentric with the driven shaft, and gear trains connecting the drive shaft and pinions.

4. The combination with a driven shaft and a drive gear rotatively mounted thereon, of a worm gear fixed to the drive gear concentric with said shaft, a sleeve secured to said shaft so as to rotate therewith, two shafts carried by the sleeve, means mounting said shafts for adjustment tangentially with respect to the worm gear, worm pinions on the latter shafts meshing with the worm gear, a motor carried by said sleeve, and gear trains connecting the motor shaft with the shafts carrying the worm pinions.

5. The combination with a driven shaft and a drive gear rotatively mounted thereon, of a worm gear fixed to the drive gear concentric with said shaft, a sleeve secured to said shaft so as to rotate therewith, said sleeve having a radially projecting head flattened on its edge at opposite sides of the sleeve, bearing blocks adjustable longitudinally of said flattened surfaces, shafts carried by said blocks, worm pinions on the latter shafts meshing with the worm gear and means for rotating said worm pinions in unison.

6. The combination with a driven shaft and a drive gear rotatively mounted thereon, of a worm gear fixed to the drive gear concentric with said shaft, a sleeve secured to said shaft so as to rotate therewith, said sleeve having a head with flat edges at opposite sides of its axis, bearing blocks adjustable longitudinally on said edges and having spaced arms projecting laterally therefrom, shafts journalled in said arms, a worm pinion and a bevel gear on each of the latter shafts, said worm pinions meshing with the worm gear, shafts extending transversely through said bearing blocks and journalled therein, said latter shafts having bevel gears thereon meshing with the similar gears on the worm pinion shafts and having spur gears thereon at the opposite sides of the blocks, a reversible electric motor carried by the sleeve and having its shaft co-axial with the driven shaft, a pinion mounted on the motor shaft, and gear trains supported on the sleeve and connecting the last-mentioned pinion with the aforesaid spur gears.

7. The combination with a driven shaft and a drive gear rotatively mounted thereon, of a worm gear fixed to the drive gear concentric with said shaft, a sleeve secured to said shaft so as to rotate therewith, said sleeve having a radially extending head, a shaft carried by the sleeve, a worm pinion on the latter shaft meshing with the worm gear, a gear housing secured to said head, a reversible electric motor mounted on the outer side of the housing and having its shaft extending into said housing and co-axial with said driven shaft, and gearing within the housing connecting the motor shaft with the shaft which carries the worm pinion.

8. The combination with a driven shaft and a drive gear rotatively mounted thereon, of a worm gear fixed to the drive gear concentric with said shaft, a sleeve secured to said shaft so as to rotate therewith, said sleeve having a radially extending head, a shaft carried by the sleeve, a worm pinion on the latter shaft meshing with the worm gear, a gear housing secured to said head, a reversible electric motor mounted on the outer side of the housing and having its shaft extending into said housing and co-axial with said driven shaft, a pinion on the motor shaft, and gearing supported by said head within the housing connecting the motor pinion with the shaft which carries the worm pinion.

9. The combination with a driven shaft, a drive gear rotatively mounted thereon, an index ring secured to the drive gear and a worm gear fixed to the drive gear, concentric with said shaft, of a sleeve secured to said shaft so as to rotate therewith, said sleeve having a radially extending head, a shaft carried by the sleeve, a worm pinion on the latter shaft meshing with the worm gear, a gear housing secured to said head, a reversible electric motor mounted on the outer side of the housing and having its shaft extending into said housing and co-axial with said driven shaft, gearing within the housing connecting the motor shaft with the shaft which carries the worm pinion, and an index hand or pointer on said housing adjacent said index ring.

10. The combination with a driven shaft and a drive gear rotatively mounted thereon of a worm gear fixed to the drive gear concentric with said shaft, a sleeve secured to said shaft so as to rotate therewith, two worm pinions ratatively mounted on the sleeve and meshing with the worm gear, a drive shaft carried by the sleeve concentric with the driven shaft and gear trains connecting the drive shaft with the pinions.

11. The combination with a driven shaft and a drive gear rotatively mounted thereon of a worm gear fixed to the drive gear concentric with said shaft, a sleeve secured to said shaft so as to rotate therewith, two worm pinions rotatively mounted on the sleeve and meshing with the worm gear, a gear housing supported by the sleeve, and means for rotating said worm pinions in unison comprising a drive shaft journaled in the housing concentric with the driven shaft, and gear trains connecting the drive shaft and pinions.

HENRY B. GREENWOOD.